US012140331B2

(12) United States Patent
Ueda

(10) Patent No.: US 12,140,331 B2
(45) Date of Patent: Nov. 12, 2024

(54) INSTALLATION POSITION CONFIRMATION SUPPORT SYSTEM, SERVER, PROGRAM, AND METHOD

(71) Applicant: DAIKIN INDUSTRIES, LTD., Osaka (JP)

(72) Inventor: Sunao Ueda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 339 days.

(21) Appl. No.: 17/838,976

(22) Filed: Jun. 13, 2022

(65) Prior Publication Data
US 2022/0307717 A1    Sep. 29, 2022

Related U.S. Application Data

(63) Continuation of application No. PCT/JP2020/046386, filed on Dec. 11, 2020.

(30) Foreign Application Priority Data

Dec. 17, 2019  (JP) ................ 2019-227369

(51) Int. Cl.
*F24F 11/58* (2018.01)
*F24F 11/49* (2018.01)
(Continued)

(52) U.S. Cl.
CPC .............. *F24F 11/58* (2018.01); *F24F 11/49* (2018.01); *F24F 11/52* (2018.01); *F24F 11/56* (2018.01);
(Continued)

(58) Field of Classification Search
CPC .. F24F 11/58; F24F 11/64; F24F 11/49; F24F 11/56; F24F 11/52; H04L 67/52; H04L 67/10
See application file for complete search history.

(56) References Cited

U.S. PATENT DOCUMENTS

2018/0279078 A1    9/2018  Yonezawa et al.
2022/0307717 A1*   9/2022  Ueda ................ F24F 11/64

FOREIGN PATENT DOCUMENTS

CN    110597116 B  * 10/2020
CN    115540158 A  * 12/2022  .............. F24F 11/30
(Continued)

OTHER PUBLICATIONS

International Search Report of corresponding PCT Application No. PCT/JP2020/046386 dated Feb. 9, 2021.
(Continued)

*Primary Examiner* — Adam D Houston
(74) *Attorney, Agent, or Firm* — Global IP Counselors, LLP

(57) ABSTRACT

A server is connected to a mobile terminal and a plurality of air conditioners via a communication line. A storage stores installation position data including space information indicating a space in which the plurality of air conditioners are installed, and layout information indicating installation positions of the plurality of air conditioners in the space. A receiver receives a request to transmit the installation position data from the mobile terminal, and a signal to confirm an installation position of a first air conditioner of the plurality of air conditioners in the installation position data. A transmitter reads the installation position data from the storage, and transmits the installation position data to the mobile terminal when receiving the request for transmitting the installation position data. A control calculation unit drives an actuator of the first air conditioner when receiving the signal to confirm the installation position from the mobile terminal.

20 Claims, 7 Drawing Sheets

(51) Int. Cl.
*F24F 11/52* (2018.01)
*F24F 11/56* (2018.01)
*F24F 11/64* (2018.01)
*H04L 67/10* (2022.01)
*H04L 67/52* (2022.01)

(52) U.S. Cl.
CPC .............. *F24F 11/64* (2018.01); *H04L 67/10* (2013.01); *H04L 67/52* (2022.05)

(56) References Cited

FOREIGN PATENT DOCUMENTS

| DE | 112021008007 T5 | * | 5/2024 | ............. F24F 11/54 |
|---|---|---|---|---|
| JP | H05248683 A | * | 9/1993 | |
| JP | 9-210429 A | | 8/1997 | |
| JP | 11-83130 A | | 3/1999 | |
| JP | 2006349307 A | * | 12/2006 | |
| JP | 2007-3126 A | | 1/2007 | |
| JP | 2007010223 A | * | 1/2007 | |
| JP | 2007003126 A | * | 7/2007 | |
| JP | 2010-7887 A | | 1/2010 | |
| JP | 4712653 B2 | | 6/2011 | |
| JP | 2020009465 A | * | 1/2020 | |
| JP | 2024048397 A | * | 4/2024 | |
| KR | 100337184 B1 | * | 5/2002 | |
| KR | 102195272 B1 | * | 12/2020 | |
| WO | WO-2012023297 A1 | * | 2/2012 | ............. F24F 11/30 |
| WO | WO-2021125104 A1 | * | 6/2021 | ............. F24F 11/49 |

OTHER PUBLICATIONS

European Search Report of corresponding EP Application No. 20 90 3557.0 dated Dec. 6, 2022.
International Preliminary Report of corresponding PCT Application No. PCT/JP2020/046386 dated Jun. 30, 2022.

* cited by examiner

INSTALLATION POSITION CONFIRMATION SUPPORT SYSTEM, SERVER, PROGRAM, AND METHOD

CROSS-REFERENCE TO RELATED APPLICATIONS

This is a continuation of International Application No. PCT/JP2020/046386 filed on Dec. 11, 2020, which claims priority to Japanese Patent Application No. 2019-227369, filed on Dec. 17, 2019. The entire disclosures of these applications are incorporated by reference herein.

BACKGROUND

Technical Field

The present disclosure relates to an installation position confirmation support system, server, program, and method.

Background Art

When an air conditioner is installed, there is performed an installation position confirmation operation of confirming whether installation position data of a plurality of air conditioners stored in a central controller matches an actual installation position of the air conditioner.

Conventionally, as in JP H09-210429 A, the installation position confirmation operation performed by a plurality of operators requires many man-hours to be completed.

SUMMARY

A server according to a first aspect is connected to a mobile terminal and a plurality of air conditioners via a communication line. The server includes a storage, a receiver, a transmitter and a control calculation unit. The storage is configured to store installation position data including space information indicating a space in which the plurality of air conditioners are installed, and layout information indicating installation positions of the plurality of air conditioners in the space. The receiver is configured to receive a request to transmit the installation position data from the mobile terminal, and a signal to confirm an installation position of a first air conditioner of the plurality of air conditioners in the installation position data. The transmitter is configured to read the installation position data from the storage, and transmit the installation position data to the mobile terminal when receiving the request for transmitting the installation position data. The control calculation unit is configured to drive an actuator of the first air conditioner when receiving the signal to confirm the installation position from the mobile terminal.

DETAILED DESCRIPTION OF EMBODIMENT(S)

Hereinafter, an installation position confirmation support system 100 (hereinafter, support system 100) according to one embodiment of the present disclosure will be described. The following embodiment specifically exemplifies the present disclosure without limiting the technical scope thereof, and can be appropriately modified within the range not departing from the purpose of the present disclosure.

(1) Outline

Figure 1:
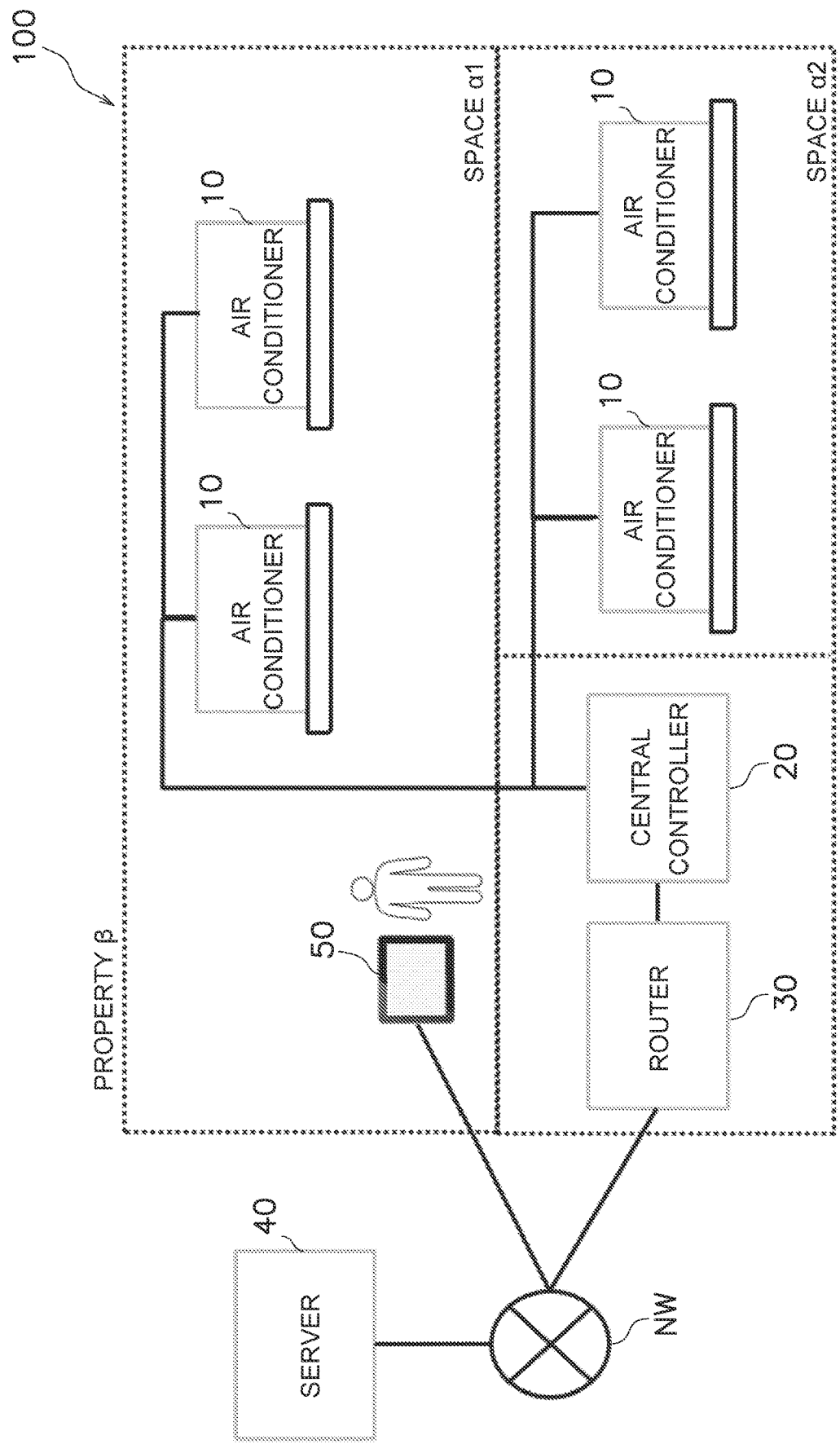
FIG. 1 is a schematic diagram of an installation position confirmation support system.

The support system 100 illustrated in FIG. 1 is a system that supports an operator who performs an installation position confirmation operation (hereinafter, confirmation operation). The confirmation operation is an operation of confirming whether or not installation position data of an air conditioner 10 stored in a management device matches an actual installation position of the air conditioner 10. The confirmation operation is performed after completion of connection of a communication wire of the air conditioner 10 installed in a space $\alpha$, an initial setting operation of the management device, and the like. Here, the space $\alpha$ is an arbitrary area inside a property $\beta$. The property $\beta$ may include a plurality of spaces a (space $\alpha 1$ and space $\alpha 2$).

In this embodiment, it is assumed that the air conditioner 10 is already installed in the space $\alpha$ and the connection of the communication wire is completed. In the management device, it is assumed that the initial setting operation of a plurality of air conditioners 10 installed in the space $\alpha$ is completed and information on the air conditioners 10 is stored. The information on the air conditioners 10 includes the installation position data of the air conditioner 10 in the space $\alpha$.

The support system 100 mainly includes the plurality of air conditioners 10 installed in the space $\alpha$, a mobile terminal 50 carried by the operator, and the management device. The management device includes a central controller 20 installed inside the property $\beta$ including the space $\alpha$, a router 30 installed inside the property $\beta$, and a server 40 installed outside the property $\beta$. In this embodiment, the server 40 may be a cloud. In this embodiment, the numbers of the air conditioners 10, the central controllers 20, the routers 30, and the mobile terminals 50 are not limited.

The plurality of air conditioners 10, the central controller 20, the router 30, the server 40, and the mobile terminal 50 included in the support system 100 are connected via a communication network NW such as the Internet.

Figure 2:
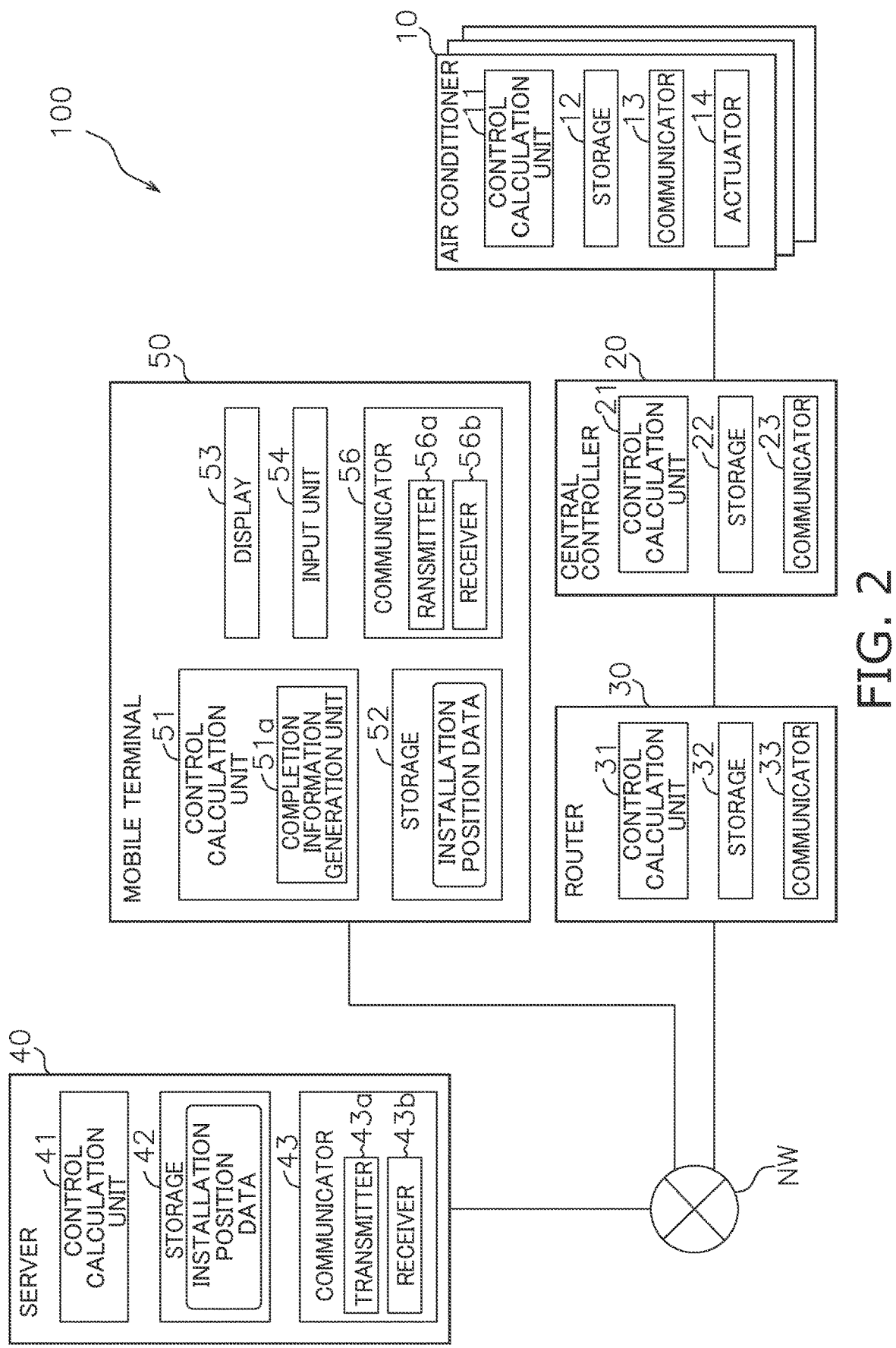
FIG. 2 is a schematic configuration diagram of the installation position confirmation support system.

FIG. 2 is a schematic configuration diagram of the support system 100. A description will be given of a configuration of each component of the support system 100.

(2) Air Conditioner 10

The air conditioner 10 as a target of the confirmation operation is, for example, an indoor unit of an air conditioning apparatus installed in the space $\alpha$. The indoor unit of the air conditioning apparatus mainly performs cooling, heating, or the like of the space $\alpha$. The air conditioner 10 as a target of the confirmation operation may be a ventilator or the like. The air conditioner 10 according to this embodiment is installed in the space $\alpha$ by an operator or the like, and operation such as connection of the communication wire and the initial setting operation of the management device is completed.

The air conditioner 10 includes a control calculation unit 11, a storage 12, a communicator 13, and an actuator 14. The control calculation unit 11 may include a processor such as a CPU or a GPU. The control calculation unit 11 reads a program stored in the storage 12 and performs predetermined calculation processing in accordance with the program. The control calculation unit 11 can also write a calculation result to the storage 12 and read information stored in the storage 12 in accordance with the program.

The communicator 13 includes an interface connected to the central controller 20 via a communication line, and transmits and receives various types of information.

The air conditioner 10 is connected to the central controller 20 via a communication line. The air conditioner 10 is connected to the server 40 and the mobile terminal 50 via the communication network NW. The control calculation unit 11 of the air conditioner 10 receives various instructions via the communication network NW and performs an operation based on the received instructions. Examples of such instructions include an air conditioning instruction transmitted from the server 40. The control calculation unit 11 of the air conditioner 10 performs cooling, heating, or the like of the space α on the basis of the air conditioning instruction transmitted from the server 40. Another example of the instructions is a confirmation instruction in the confirmation operation transmitted from the mobile terminal 50. The confirmation instruction is an instruction to operate the actuator 14 of the air conditioner 10 to perform the confirmation operation.

Here, it is preferable that the operator can physically or visually recognize whether the actuator 14 is operating when the actuator 14 is operating on the basis of the confirmation instruction. The actuator 14 is, for example, a fan, a flap, or the like included in the air conditioner 10.

The control calculation unit 11 of the air conditioner 10 may perform a cooling or heating operation of the space α instead of operating only the actuator 14 on the basis of the confirmation instruction. The content of the operation performed by the air conditioner 10 on the basis of the confirmation instruction may be arbitrarily determined by the operator or the like.

(3) Central Controller 20

The central controller 20 is achieved by a computer. The central controller 20 includes a control calculation unit 21, a storage 22, and a communicator 23.

The control calculation unit 21 may include a processor such as a CPU or a GPU. The control calculation unit 21 reads a program stored in the storage 22 and performs predetermined calculation processing in accordance with the program. The control calculation unit 21 can also write a calculation result to the storage 22 and read information stored in the storage 22 in accordance with the program.

Examples of the storage 22 include a hard disk drive (HDD), a solid state drive (SSD), and a non-volatile memory.

The communicator 23 includes an interface connected to each air conditioner 10 via a communication line or an interface connected to the router 30 via wired LAN communication or the like, and transmits and receives various types of information.

(4) Router 30

The router 30 is achieved by a computer. The router 30 includes a control calculation unit 31, a storage 32, and a communicator 33.

The control calculation unit 31 may include a processor such as a CPU or a GPU. The control calculation unit 31 reads a program stored in the storage 32 and performs predetermined calculation processing in accordance with the program. The control calculation unit 31 can also write a calculation result to the storage 32 and read information stored in the storage 32 in accordance with the program.

Examples of the storage 32 include a hard disk drive (HDD), a solid state drive (SSD), and a non-volatile memory.

The communicator 33 includes an interface connected to the central controller 20 via wired. LAN communication, and transmits and receives various types of information.

(5) Server 40

The server 40 is a device that performs management or the like of the air conditioner 10 and is achieved by a computer. The server 40 includes a control calculation unit 41, a storage 42, and a communicator 43.

The control calculation unit 41 may include a processor such as a CPU or a GPU. The control calculation unit 41 reads a program stored in the storage 42 and performs predetermined calculation processing in accordance with the program. The control calculation unit 41 can also write a calculation result to the storage 42 and read information stored in the storage 42 in accordance with the program.

The storage 42 stores information on the air conditioner 10 registered by the initial setting operation or the like of the air conditioner 10 and the installation position data.

The information on the air conditioner 10 stores identification information of the air conditioner 10. The identification information of the air conditioner 10 includes, for example, a name, a model, a model number, a MAC address, and the like of the air conditioner 10. The information on the air conditioner 10 may include information such as a capacity and capability of the air conditioner 10 in addition to the identification information of the air conditioner 10.

Figure 3:
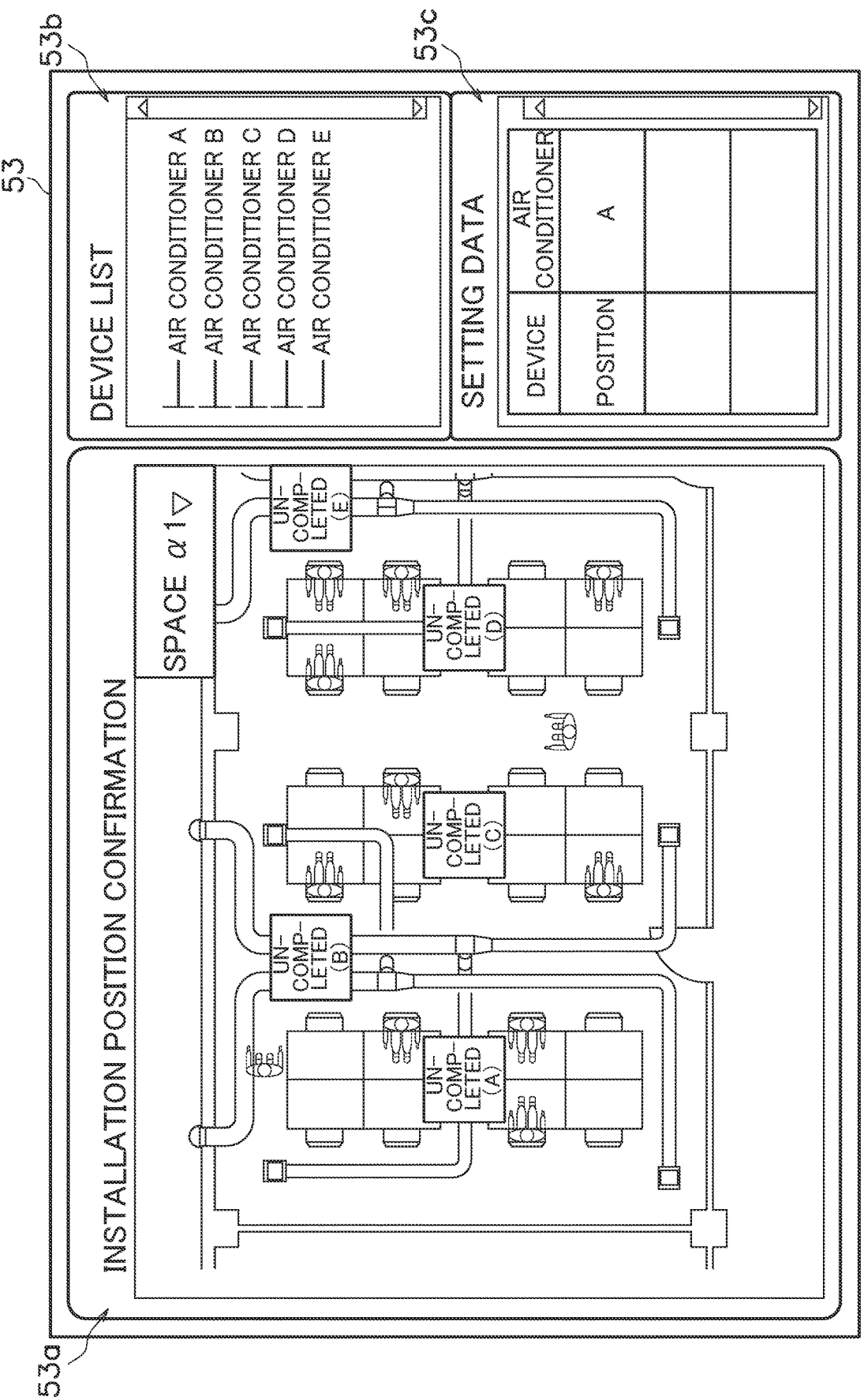
FIG. 3 is an example of installation position data.

The installation position data includes space information indicating a space in which the air conditioner 10 is installed, and layout information indicating an installation position of the air conditioner 10 in the space information. The space information is, for example, a location of the property β in which the air conditioner 10 is installed, a location of the space α in the property drawing information of the space α, and the like. The layout information is information on an arrangement of the air conditioner 10 in the space α. As illustrated in FIG. 3, the space information and the layout information (installation position data) may be stored as information of one drawing.

Examples of the storage 42 include a hard disk drive (HDD), a solid state drive (SSD), and a non-volatile memory.

The communicator (transmitter-receiver) 43 includes an interface connected to the router 30 via the communication network NW and an interface connected to the mobile terminal 50 via the communication network NW. The communicator 43 functions as a transmitter 43a that transmits various types of information or a receiver 43b that receives various types of information. The communication network NW connecting the server 40 and the mobile terminal 50 is, for example, wireless WAN communication.

(6) Mobile Terminal 50

The mobile terminal 50 includes a control calculation unit 51, a storage 52, a display 53, an input unit 54, and a communicator 56.

The control calculation unit 51 may include a processor such as a CPU or a GPU. The control calculation unit 51 reads a program stored in the storage 52 and performs predetermined calculation processing in accordance with the program. The control calculation unit 51 can also write a calculation result to the storage 52 and read information stored in the storage 52 in accordance with the program.

Note that this program may be distributed in a state of being stored in a storage medium or the like.

The mobile terminal 50 acquires the installation position data stored in the server 40 and stores the installation position data in the storage 52. The installation position data may be input to the mobile terminal 50 via the storage medium or the like, or may be downloaded from the server 40 via the communication network NW. A method of storing the installation position data is not limited. The installation position data stored in the storage 52 is updated on the basis of the information input to the input unit 54. The storage 52 may acquire and store in addition to the installation position data, information on the air conditioner 10 stored in the server 40, etc.

Examples of the storage 52 include a hard disk drive (HDD), a solid state drive (SSD), and a non-volatile memory. Thus, the storage 52 is a computer readable medium that can be encoded with various programs and store information as disclosed herein. Likewise, the storages 12, 22, 32 and 42 are also each preferably a computer readable medium that can be encoded with various programs and store information as disclosed herein.

Figure 4:
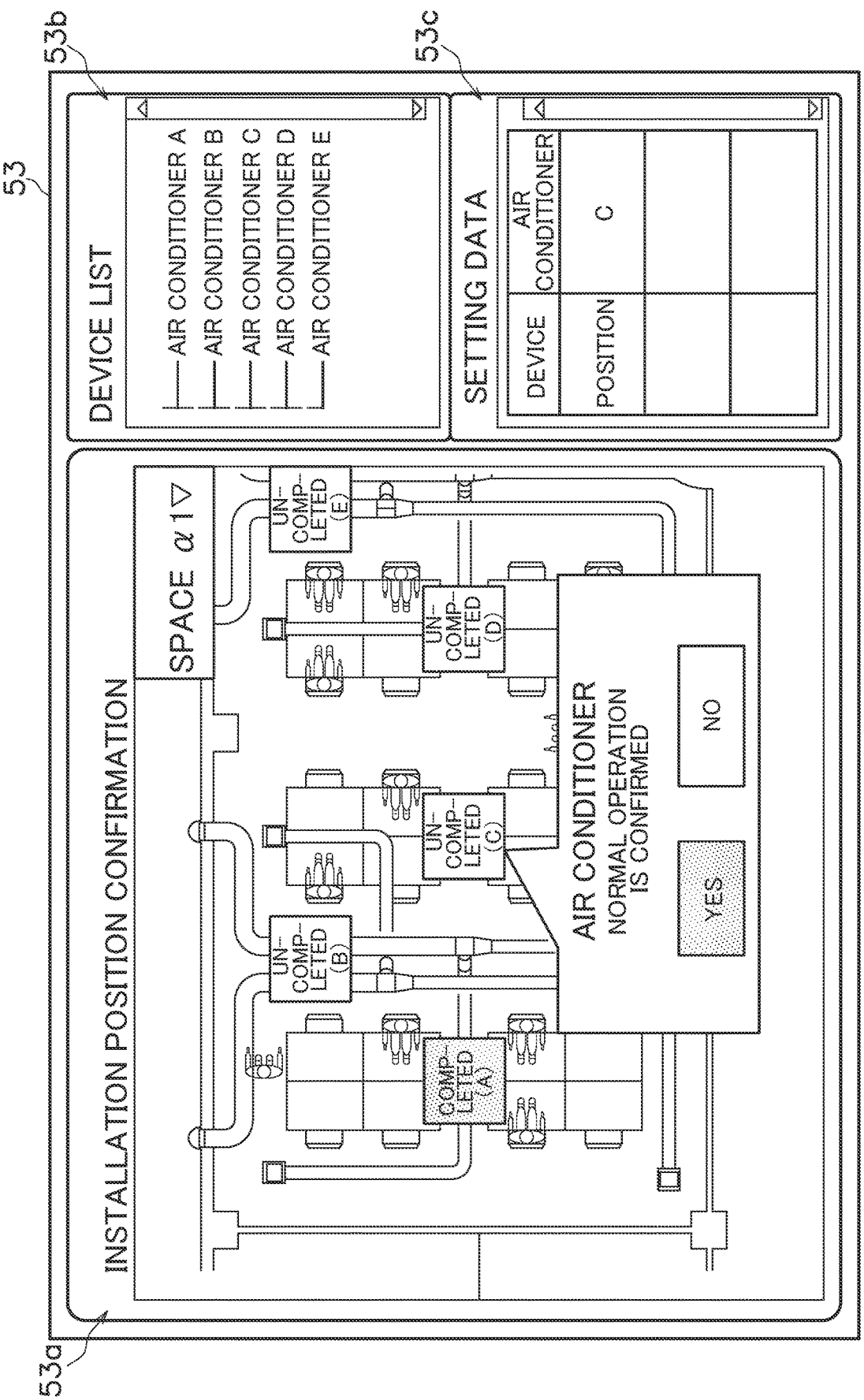
FIG. 4 is an example of the installation position data.

The control calculation unit 51 includes a completion information generation unit 51a as a functional unit achieved on the basis of the program stored in the storage 52. The completion information generation unit 51a generates completion information which is information to be transmitted to the server 40. The completion information is information indicating that the confirmation operation for all the air conditioners 10 included in the space α has been completed. The completion information is transmitted to the server 40 via the communication network NW, and is stored as information of the space a in which the air conditioners 10 are installed. The completion information may include installation position data updated by the operator. The display 53 displays the installation position data stored in the storage 52. The display 53 is, for example, a touch panel or the like, and functions as the display 53 and also functions as the input unit 54. The operator performs the confirmation operation on the basis of the installation position data displayed on the touch panel as the display 53. The operator inputs a confirmation instruction from the touch panel as the input unit 54. The operator inputs information indicating that the installation position is correct from the touch panel as the input unit 54 to the touch panel as the input unit 54. FIGS. 3 and 4 illustrate examples of a display screen of the display 53 and an input screen of the input unit 54.

In the display 53 illustrated in FIGS. 3 and 4, a display area 53a displays the installation position data stored in the storage 52. Here, in the installation position data, the air conditioners 10 are represented as icons indicating the installation positions (layout information) of the air conditioners 10 in the drawing information (space information) of the space α1. In each of the icons, a sign corresponding to the air conditioner displayed in a display area 53b is written adjacent to each of the icons. Note that, in FIG. 3, "uncompleted" icons indicate that the confirmation operation has not been completed yet. The display area 53b displays a list of the plurality of air conditioners 10 installed in the space α. The operator can select the air conditioner 10 shown in the display area 53a or the display area 53b and input predetermined information. A display area 53c displays information on the installation position data currently displayed on the display 53. In FIG. 3, when one of the icons shown in the display area 53a or one device in a device list shown in the display area 53b is touched, information on the selected one device and a position where the device is installed is displayed in the display area 53c.

The communicator 56 includes an interface connected to the server 40 via the communication network NW. The communicator 56 functions as a transmitter 56a that transmits various types of information or a receiver 56b that receives various types of information.

(7) Flow of Processing in Support System 100

Figure 5:
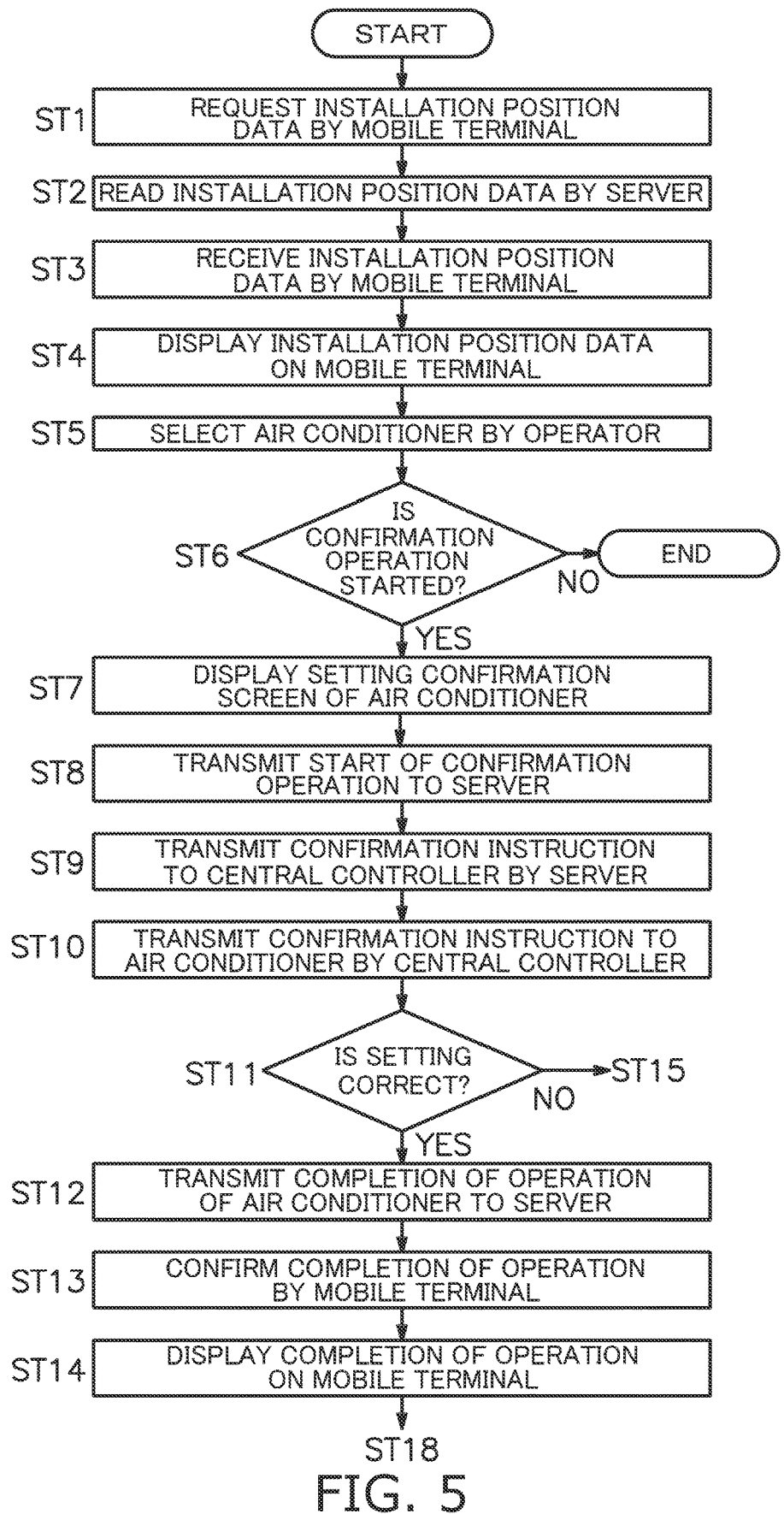
FIG. 5 is a flowchart illustrating a flow of processing of a mobile terminal.
Figure 6:
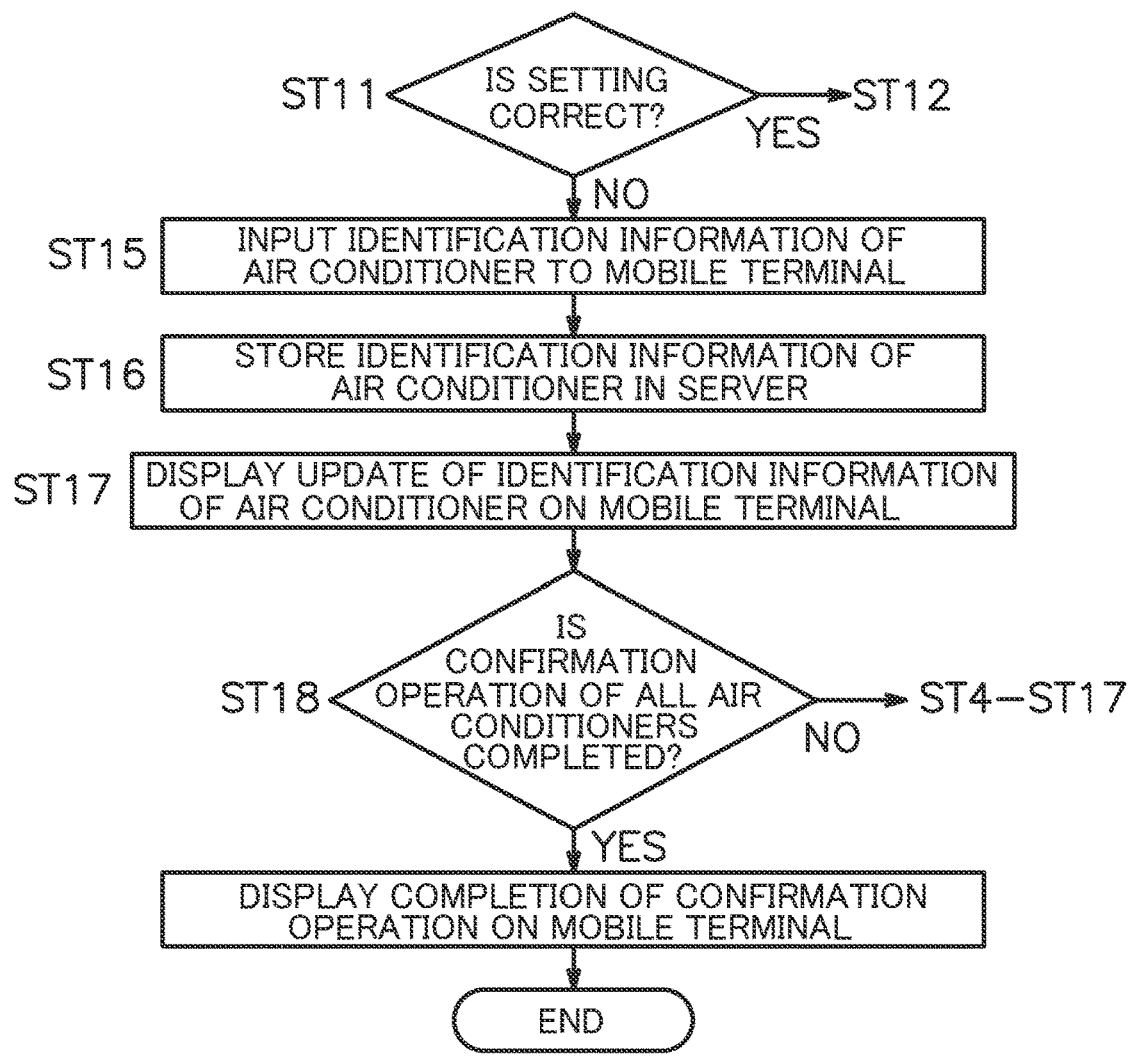
FIG. 6 is a flowchart illustrating a flow of processing of the mobile terminal.

Hereinafter, a flow of processing in the support system 100 will be described with reference to FIGS. 5 and 6. FIGS. 5 and 6 are flowcharts illustrating the flow of processing in the support system 100.

First, in step ST1, the mobile terminal 50 transmits a signal for requesting the installation position data to the server 40. The control calculation unit 41 of the server 40 receives the signal for requesting the installation position data from the mobile terminal 50. Here, the signal for requesting the installation position data includes information for specifying the installation position data requested to be transmitted to the server 40.

Next, the control calculation unit 41 of the server 40 refers to and reads data stored in the storage 42 (step ST2), and transmits the installation position data corresponding to the received signal to the mobile terminal 50. The mobile terminal 50 receives the installation position data from the server 40 (step ST3).

The control calculation unit 51 of the mobile terminal 50 stores the installation position data in the storage 52 of the mobile terminal 50 and displays the installation position data on the display 53 (step ST4). The display 53 displays the installation position data as illustrated in FIG. 3, for example.

In step ST5, the operator selects information on one of the air conditioners 10 from the installation position data displayed on the display 53 of the mobile terminal 50. The information of the air conditioner 10 is displayed on the display 53 as, for example, an icon corresponding to the air conditioner 10.

When the operation in step ST5 is performed, in step ST6, the control calculation unit 51 of the mobile terminal 50 causes the display 53 to present a display for selecting whether or not the operator starts the confirmation operation.

In step ST6, when the operator operates the input unit 54 to start the confirmation operation, the processing proceeds to step ST7. When a state in which the operator does not operate the input unit 54 continues for several minutes, this processing ends.

In step ST7, the control calculation unit 51 of the mobile terminal 50 causes the display 53 to present a display for the operator to input whether or not setting of the air conditioner 10 selected by the operator in step ST5 is correct. For example, the display 53 performs display as illustrated in FIG. 4.

Meanwhile, the control calculation unit 51 of the mobile terminal 50 transmits information of starting the confirmation operation for the air conditioner 10 selected in step ST5 to the control calculation unit 41 of the server 40 (step ST8). The control calculation unit 41 of the server 40 receives the information transmitted by the mobile terminal 50 via the receiver.

In step ST9, the control calculation unit 41 of the server 40 transmits, to the central controller 20, a signal for transmitting a confirmation instruction for operating the actuator 14 of the air conditioner 10 corresponding to the information on the air conditioner 10 selected in step ST5. The central controller 20 receives the signal from the server 40.

In step ST 10, the central controller 20 transmits a confirmation instruction to the selected air conditioner 10. The air conditioner 10 receives the confirmation instruction from the central controller 20. The air conditioner 10 operates the actuator 14 on the basis of the confirmation instruction from the central controller 20.

Here, when the air conditioner 10 is installed at an appropriate position in the space α and the connection of the communication wire is appropriately completed, the actuator 14 of the air conditioner 10 corresponding to the information on the air conditioner 10 selected in step ST5 operates.

In this case, the operator confirms that the actuator 14 of the selected air conditioner 10 is operating, and inputs information indicating that the setting is correct via the display 53 of the mobile terminal 50 in step ST7 (step ST11). In step ST 11, when the information indicating that the setting is correct is input, the processing proceeds to step ST 12. In step ST11, when information indicating that the setting is incorrect is input, the processing proceeds to step ST15.

When the information indicating that the setting is correct is input to the mobile terminal 50 in step ST 11, the control calculation unit 51 of the mobile terminal 50 transmits information indicating that the confirmation operation in the air conditioner 10 has been completed to the control calculation unit 41 of the server 40 (step ST12). The control calculation unit 41 of the server 40 receives, from the mobile terminal 50, the information indicating that the confirmation operation in the air conditioner 10 has been completed.

In step ST 13, the control calculation unit 41 of the server 40 transmits that it has received the information indicating that the confirmation operation has been completed to the control calculation unit 51 of the mobile terminal 50, and the control calculation unit 51 of the mobile terminal 50 receives the information.

In step ST 14, the control calculation unit 51 of the mobile terminal 50 displays the information indicating that the confirmation operation for the air conditioner 10 has been completed on the display 53. For example, on the display 53, as shown in FIG. 4, the icon of the air conditioner 10 displays an icon "completed" as a display indicating that the confirmation operation has been completed.

When the air conditioner 10 is installed at an incorrect position in the space α or the communication wire is incorrectly connected, the actuator 14 of the air conditioner 10 "different" from the air conditioner 10 corresponding to the information on the air conditioner 10 selected in step ST5 is driven.

In this case, the operator confirms that the actuator 14 of the air conditioner 10 "different" from the selected air conditioner 10 is driven, and inputs information indicating that the setting is incorrect via the display 53 of the mobile terminal 50 in step ST7 (step ST11). In step ST11, when information indicating that the setting is incorrect is input, the processing proceeds to step ST15.

In step ST 15, the operator inputs the identification information of the air conditioner 10 that the actuator 14 is driving to the mobile terminal 50. The control calculation unit 51 of the mobile terminal 50 stores the input identification information in the storage 52. The control calculation unit 51 of the mobile terminal 50 transmits the input identification information to the control calculation unit 41 of the server 40 via the transmitter. The control calculation unit 41 of the server 40 receives the identification information input to the mobile terminal 50.

In step ST16, the control calculation unit 41 of the server 40 stores (updates) the identification information received in step ST15 in the storage 42.

When step ST16 is completed, information indicating that the identification information of the air conditioner 10 has been updated is displayed on the display 53 of the mobile terminal 50 in step ST17.

The operator may perform the confirmation operation for the air conditioner 10 again after the identification information of the air conditioner 10 is updated. After the confirmation operation for the air conditioner 10 is completed, the operator performs the confirmation operation for all the air conditioners 10 in the space to which the support system 100 is applied (step ST18) as in steps ST5 to ST17. When the confirmation operation for all the air conditioners 10 is completed in step ST18, in other words, when the icons of all the air conditioners 10 installed in the space α1 illustrated in FIG. 3 turn to "completed", the processing proceeds to step ST19.

In step ST 19, the display 53 of the mobile terminal 50 displays that the confirmation operation has been completed.

(8) Characteristics (8-1)

The server 40 of the present disclosure is connected to the mobile terminal 50 and the plurality of air conditioners 10 via a communication line. The server 40 is communicable with the mobile terminal 50 and the plurality of air conditioners 10. The server 40 includes the storage 42, the receiver 43a, the transmitter 43b, and the control calculation unit 41. The storage 42 stores the installation position data including the space information indicating the space in which the plurality of air conditioners 10 are installed and the layout information indicating the installation positions of the plurality of air conditioners 10 in the space. The receiver 43a receives, from the mobile terminal 50, a request for transmitting the installation position data and a signal for confirming the installation position of a first air conditioner 10 of the plurality of air conditioners 10 in the installation position data. The receiver 43a also receives a signal indicating a confirmation result of the installation position data from the mobile terminal 50. When receiving the request for transmitting the installation position data, the transmitter 43b reads the installation position data from the storage 42 and transmits the installation position data to the mobile terminal 50. The control calculation unit 41 drives the actuator 14 of the first air conditioner 10 when receiving the signal for confirming the installation position from the mobile terminal 50.

In this way, the server 40 supports the installation position confirmation operation by the operator. As a result, a process of operation by the operator is reduced, which contributes to shortening of operation time. In addition, an operation conventionally performed by two or more persons can be performed by one person, and costs such as labor costs can be reduced. Man-hours required for completing an installation position confirmation operation can be suppressed.

(8-2)

The control calculation unit 41 of the server 40 of the present disclosure drives the actuator 14 of the actuators 14 of the air conditioner 10 that is visually or physically recognizable as to whether being operating.

It is therefore easy to confirm whether the installation position data matches the actual installation position of the air conditioner 10, and the operator can efficiently perform the installation position confirmation operation.

(8-3)

The control calculation unit 41 of the server 40 of the present disclosure drives the actuators 14 sequentially and automatically when receiving a predetermined operation from the mobile terminal 50.

As a result, the operator can reduce the process of operation, and can efficiently perform the installation position confirmation operation.

(8-4)

The installation position confirmation support system 100 of the present disclosure is a system that supports the installation position confirmation operation of the plurality of air conditioners 10. The installation position confirmation support system 100 includes the mobile terminal 50 and the management device. The management device is communicable with the mobile terminal 50 and the plurality of air conditioners 10. The management device includes the storage 42, the receiver 43a, the transmitter 43b, and the control calculation unit 41. The storage 42 stores the installation position data including the space information indicating the space in which the air conditioners 10 are installed and the layout information indicating the installation positions of the plurality of air conditioners 10 in the space. The receiver 43a receives, from the mobile terminal 50, a request for transmitting the installation position data and a signal for confirming the installation position of at least one of the air conditioners 10 in the installation position data. The receiver 43a also receives a signal indicating a confirmation result of the installation position data from the mobile terminal 50. The transmitter 43b transmits the installation position data to the mobile terminal 50. The control calculation unit 41 drives the actuator 14 of the air conditioner 10. The mobile terminal 50 includes the display 53 that displays installation position data. The mobile terminal 50 transmits an instruction to operate the air conditioner 10 as a target of the installation position confirmation operation to the management device on the basis of the installation position data. When receiving the instruction, the management device refers to the data about the air conditioner 10 stored in the storage 42 of the management device, and the control calculation unit 41 drives the actuator 14 of the air conditioner 10 as a target of the instruction.

Conventionally, this installation position confirmation operation has been performed by a plurality of operators using mobile phones. Specifically, the installation position confirmation operation is performed by two or more operators using mobile phones. One of the operators operates the central controller. The other operator checks the operation of an operated air conditioner of the plurality of air conditioners. The operator notifies the other operator, using a mobile phone, that the operation of the air conditioner has been confirmed, etc. In this way, the conventional installation position confirmation operation requires a plurality of operators and a process of operation such as confirmation by each operator using a mobile phone by performing the operation using the mobile phone.

The installation position confirmation support system 100 illustrated in the present disclosure allows one person to perform the installation position confirmation operation in the space α by performing the installation position confirmation operation using the mobile terminal 50. When there are a plurality of operators, the installation position confirmation operation can be performed separately in each space α in the property β, and work efficiency is high. Since a process of operation in which each operator exchanges confirmation with each other using a mobile phone is reduced, the work efficiency is high. It is therefore possible to reduce time required for the installation position confirmation operation, and to reduce costs such as labor costs. Man-hours required for completing an installation position confirmation operation can be suppressed.

(8-5)

The control calculation unit 41 of the installation position confirmation support system 100 of the present disclosure drives the actuator 14 of the actuators 14 of the air conditioner 10, the actuator 14 being visually or physically recognizable as to whether being operating.

It is therefore easy to confirm whether the installation position data matches the actual installation position of the air conditioner 10, and the operator can efficiently perform the installation position confirmation operation.

(8-6)

The control calculation unit 41 of the installation position confirmation support system 100 of the present disclosure drives the actuators 14 sequentially and automatically when receiving a predetermined operation from the mobile terminal 50.

As a result, the operator can reduce the process of operation, and can efficiently perform the installation position confirmation operation.

(8-7)

An installation position confirmation support method of the present disclosure is an installation position confirmation method of confirming whether the installation position data of the air conditioner 10 stored in the management device matches the actual installation position of the air conditioner 10. The installation position confirmation support method includes an acquisition step ST3, a drive step ST10, an input step ST11, and an update step ST16. In the acquisition step ST3, the mobile terminal 50 acquires the installation position data from the management device. In the drive step ST10, the air conditioner 10 as a target of the installation position confirmation operation is driven on the basis of the installation position data displayed on the display 53 of the mobile terminal 50. In the input step ST11, when the air conditioner 10 as a target is driven on the basis of the drive step ST10, the information indicating that the installation position is correct is input. In the update step ST16, when the air conditioner 10 other than the air conditioner 10 as a target is driven on the basis of the drive step ST10, the installation position data stored in the management device is updated.

The installation position confirmation support method is executed using the installation position confirmation support system 100 or the like of the present disclosure illustrated in the present disclosure and supports the installation position confirmation operation by the operator. As a result, a process of operation by the operator is reduced, which contributes to shortening of operation time. In addition, an operation conventionally performed by two or more persons can be perforated by one person, and costs such as labor costs can be reduced. Man-hours required for completing an installation position confirmation operation can be suppressed.

(9) Modifications (9-1)

Figure 7:
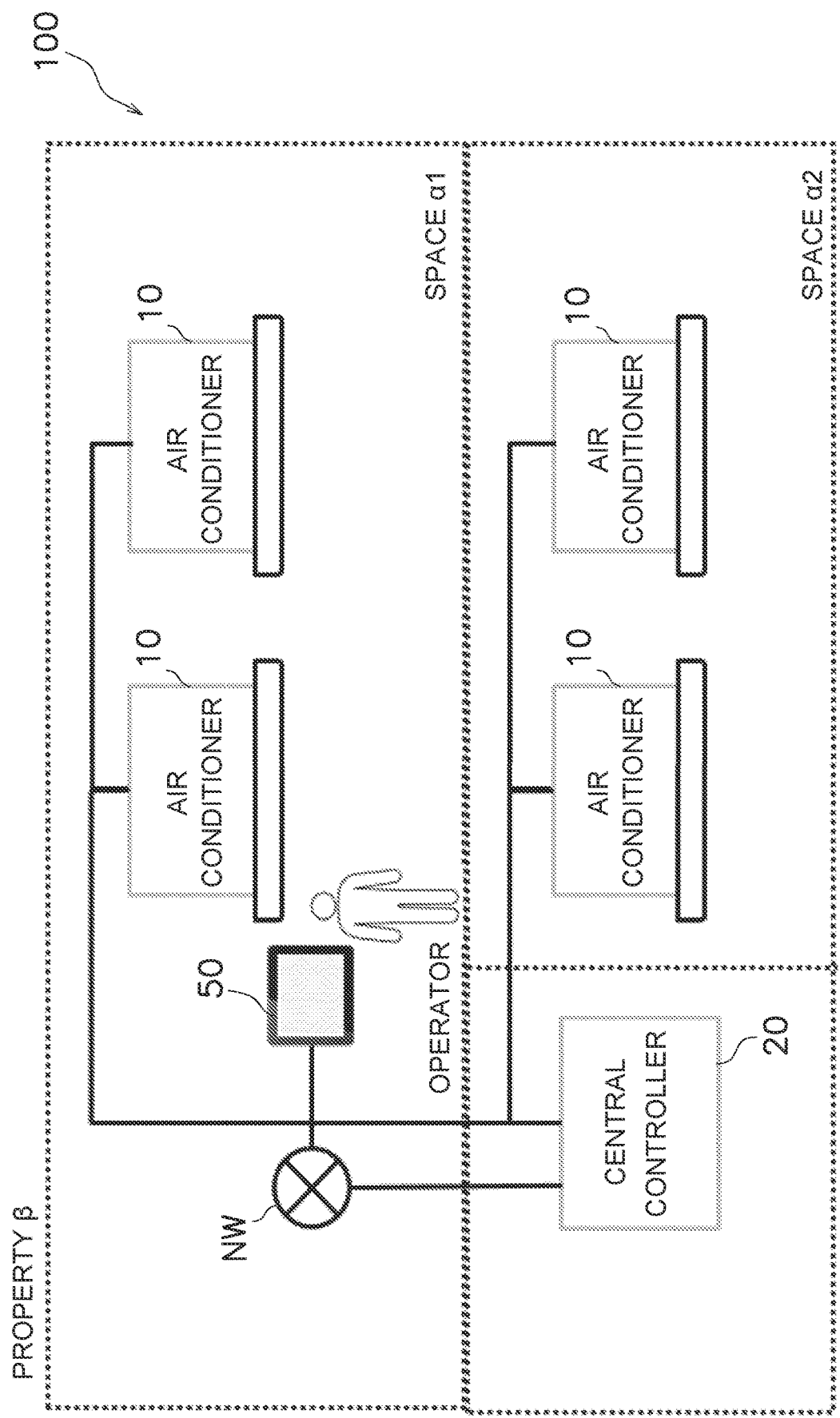
FIG. 7 is a schematic diagram of an installation position confirmation support system according to a modification.

In the present modification, the server 40 of the support system 100 is connected to the central controller 20, but the server 40 does not need to be connected to the central controller 20 as illustrated in FIG. 7.

In the embodiment, the mobile terminal 50 is connected to the central controller 20 via the server 40, but the mobile terminal 50 may be connected to the central controller 20 without the server 40 as illustrated in FIG. 7. The mobile terminal 50 may communicate with the central controller 20 using near field communication or the like. The storage 22 of the central controller 20 stores the installation position data. The mobile terminal 50 acquires the installation position data from the central controller 20 using near field communication or the like.

As a result, the operator can efficiently perform the installation position confirmation operation using the mobile terminal 50.

(9-2)

In the embodiment, the operator selects one of the air conditioners 10 displayed in the installation position data and performs the installation position confirmation operation. When the installation position confirmation operation of the air conditioner 10 is completed, the operator selects another air conditioner 10 and performs the installation position confirmation operation. Alternatively, the mobile terminal 50 may transmit an instruction to operate the air conditioners 10 sequentially and automatically to the management device. Specifically, for example, when information indicating that the installation position of one air conditioner 10 is correct is input to the mobile terminal 50, the control calculation unit 41 of the server 40 transmits a confirmation instruction to the air conditioner 10 assigned with a sign subsequent to a sign corresponding to the one air conditioner 10. For example, when the installation position confirmation operation of an air conditioner A is started and information indicating that the installation position of the air conditioner A is correct is input, the installation position confirmation operation of an air conditioner B is started. On the display of the mobile terminal 50, the icon of the air conditioner 10 that has transmitted the confirmation instruction is displayed in a highlighted manner.

As a result, the process of operation can be reduced, and the labor of the operator can be reduced.

(9-3)

The installation position confirmation support system according to the embodiment may be distributed as an installation position confirmation support program executed in the mobile terminal 50.

The installation position confirmation support program of the present disclosure is communicable with the mobile terminal 50 and the plurality of air conditioners 10. The installation position confirmation support program is a program used in the management device having the storage 42, and supports the installation position confirmation operation of the plurality of air conditioners 10. The installation position continuation support program causes execution of a reception step ST1, a reading step ST2, an installation position data transmission step ST3, an installation position confirmation signal reception step ST6, a drive signal transmission step ST10, and confirmation result reception steps ST12 and ST15. In the reception step ST1, a request for transmitting the installation position data is received from the mobile terminal 50. The installation position data includes the space information indicating the space in which the plurality of air conditioners 10 are installed and the layout information indicating the installation positions of the plurality of air conditioners 10 in the space. In the reading step ST2, the installation position data is read from the storage 42 in response to the request for transmitting the installation position data. In the installation position data transmission step ST3, the installation position data is transmitted to the mobile terminal 50. In the installation position confirmation signal reception step ST6, a signal for starting the installation position confirmation of the first air conditioner 10 of the plurality of air conditioners 10 is received from the mobile terminal 50. In the drive signal transmission step ST10, a drive signal for driving the actuator 14 of the first air conditioner 10 is transmitted from the management device to the first air conditioner 10. In the drive signal transmission step ST10, the actuator 14 of the actuators 14 of the air conditioner 10 is driven, the actuator 14 being visually or physically recognizable as to whether being operating. In the confirmation result reception steps ST12 and ST15, a signal indicating the confirmation result of the installation position data of the first air conditioner 10 is received from the mobile terminal 50.

The installation position confirmation support program is executed in the server 40 or the like of the present disclosure illustrated in the present disclosure and supports the installation position confirmation operation by the operator. As a result, a process of operation by the operator is reduced, which contributes to shortening of operation time. In addition, an operation conventionally performed by two or more persons can be performed by one person, and costs such as labor costs can be reduced. The installation position confirmation support program contributes to suppressing man-hours required for completing the confirmation operation of the installation position. An operator can efficiently perform the installation position confirmation operation.

(10)

Although the embodiment of the present disclosure has been described above, it will be understood that various changes in form and details can be made without departing from the spirit and scope of the present disclosure described in claims.

The invention claimed is:

1. A server connected to a mobile terminal and a plurality of air conditioners via a communication line, the server comprising:
    a storage configured to store installation position data including
        space information indicating a space in which the plurality of air conditioners are installed and
        layout information indicating installation positions of the plurality of air conditioners in the space;
    a receiver configured to receive
        a request to transmit the installation position data from the mobile terminal and
        a signal to confirm an installation position of a first air conditioner of the plurality of air conditioners in the installation position data;
    a transmitter configured to
        read the installation position data from the storage and
        transmit the installation position data to the mobile terminal when receiving the request for transmitting the installation position data; and
    a control calculation unit configured to drive an actuator of the first air conditioner when receiving the signal to confirm the installation position from the mobile terminal.

2. The server according to claim 1, wherein
    the control calculation unit is configured to drive the actuator of a plurality of actuators of the plurality of air conditioners, and
    the actuator is visually or physically recognizable as to whether operating.

3. The server according to claim 1, wherein
    the control calculation unit is configured to drive a plurality of actuators of the plurality of air conditioners sequentially and automatically when receiving a predetermined operation from the mobile terminal.

4. The server according to claim 1, wherein
the receiver is configured to receive a signal indicating a confirmation result of the installation position data from the mobile terminal.

5. An installation position confirmation support system configured to support an installation position confirmation operation of a plurality of air conditioners, the installation position confirmation support system comprising:
a mobile terminal; and
a management device, the management device being communicable with the mobile terminal and the plurality of air conditioners, and the management device including
a storage configured to store
installation position data including space information indicating a space in which the air conditioners are installed and
layout information indicating installation positions of the plurality of the air conditioners in the space,
a receiver configured to receive
a request to transmit the installation position data from the mobile terminal and
a signal to confirm an installation position of at least one of the air conditioners in the installation position data,
a transmitter configured to transmit the installation position data to the mobile terminal, and
a control calculation unit configured to drive an actuator of the air conditioner,
the mobile terminal including a display configured to display the installation position data,
the mobile terminal being configured to transmit an instruction to operate the air conditioner as a target of the installation position confirmation operation to the management device based on the installation position data, and
when receiving the instruction,
the management device being configured to refer to data about the air conditioner stored in the storage of the management device, and
the control calculation unit being configured to drive the actuator of the air conditioner as a target of the instruction.

6. The installation position confirmation support system (100) according to claim 5, wherein
the control calculation unit is configured to drive the actuator of a plurality of actuators of the plurality of air conditioners, and
the actuator is visually or physically recognizable as to whether operating.

7. The installation position confirmation support system according to claim 5, wherein
the control calculation unit is configured to drive a plurality of actuators of the plurality of air conditioners sequentially and automatically when receiving a predetermined operation from the mobile terminal.

8. The installation position confirmation support system according to claim 5, wherein
the receiver is configured to receive a signal indicating a confirmation result of the installation position data from the mobile terminal.

9. A computer readable medium encoded with an installation position confirmation support program used in a management device that is communicable with a mobile terminal and a plurality of air conditioners and includes a storage, the program supporting an installation position confirmation operation of the plurality of air conditioners, the installation position confirmation support program being executed to cause:
receiving, from the mobile terminal, a request to transmit installation position data including
space information indicating a space in which the plurality of the air conditioners are installed and
layout information indicating installation positions of the plurality of air conditioners in the space;
reading the installation position data from the storage in response to the request to transmit the installation position data;
transmitting the installation position data to the mobile terminal;
receiving, from the mobile terminal (50), a signal to start confirmation of an installation position of a first air conditioner of the plurality of air conditioners; and
transmitting a drive signal to drive an actuator of the first air conditioner from the management device to the first air conditioner.

10. The computer readable medium encoded with the installation position confirmation support program according to claim 9, wherein
in transmitting the drive signal, the actuator of a plurality of actuators of the plurality of air conditioners is driven, and
the actuator is visually or physically recognizable as to whether operating.

11. The computer readable medium encoded with the installation position confirmation support program according to claim 9, the installation position confirmation support program being executed to further cause:
receiving a signal indicating a confirmation result of the installation position data of the first air conditioner from the mobile terminal.

12. An installation position confirmation support method of confirming whether installation position data of an air conditioner stored in a management device matches an actual installation position of the air conditioner, the installation position confirmation support method comprising:
acquiring, by a mobile terminal, the installation position data from the management device; and
driving the air conditioner as a target of a confirmation operation of the installation position based on the installation position data displayed on a display of the mobile terminal.

13. The installation position confirmation support method according to claim 12, the method further comprising:
inputting information indicating that the installation position is correct when the air conditioner as the target is driven based on the driving of the air conditioner.

14. The installation position confirmation support method according to claim 13, the method further comprising:
updating the installation position data stored in the management device when an air conditioner other than the air conditioner as the target s driven based on the driving of the air conditioner.

15. The server according to claim 2, wherein
the control calculation unit is configured to drive the plurality of actuators of the plurality of air conditioners sequentially and automatically when receiving a predetermined operation from the mobile terminal.

16. The server according to claim 2, wherein
the receiver is configured to receive a signal indicating a confirmation result of the installation position data from the mobile terminal.

17. The server according to claim 3, wherein
the receiver is configured to receive a signal indicating a confirmation result of the installation position data from the mobile terminal.

18. The installation position confirmation support system according to claim 6, wherein
the control calculation unit is configured to drive the plurality of actuators of the plurality of air conditioners sequentially and automatically when receiving a predetermined operation from the mobile terminal.

19. The installation position confirmation support system according to claim 6, wherein
the receiver is configured to receive a signal indicating a confirmation result of the installation position data from the mobile terminal.

20. The installation position confirmation support system according to claim 7, wherein
the receiver is configured to receive a signal indicating a confirmation result of the installation position data from the mobile terminal.

* * * * *